United States Patent [19]

Stiles

[11] Patent Number: 5,764,556

[45] Date of Patent: Jun. 9, 1998

[54] METHOD AND APPARATUS FOR PERFORMING FLOATING POINT ADDITION

[75] Inventor: David Stiles, Los Gatos, Calif.

[73] Assignee: Advanced Micro Devices, Inc., Austin, Tex.

[21] Appl. No.: 678,870

[22] Filed: Jul. 12, 1996

Related U.S. Application Data

[60] Provisional application No. 60/001,509 Jul. 18, 1995.

[51] Int. Cl.$^6$ .................................................... G06F 7/38
[52] U.S. Cl. ......................... 364/748.11; 364/748.13
[58] Field of Search ........................ 364/748.01, 748.11, 364/748.13, 784.01

[56] References Cited

U.S. PATENT DOCUMENTS

| | | | |
|---|---|---|---|
| 4,639,887 | 1/1987 | Farmwald | 364/748.11 |
| 4,999,803 | 3/1991 | Turrini et al. | 364/748.11 |
| 5,063,530 | 11/1991 | Ishikawa et al. | 364/748.11 |
| 5,136,536 | 8/1992 | Ng | 364/748.11 |
| 5,197,023 | 3/1993 | Nakayama | 364/748.11 |
| 5,247,471 | 9/1993 | Hilker et al. | 364/748.11 |

*Primary Examiner*—Reba I. Elmore
*Assistant Examiner*—Robert J. Dolan
*Attorney, Agent, or Firm*—Townsend and Townsend and Crew LLP; Kenneth R. Allen

[57] ABSTRACT

A numeric processor system is provided with a floating point adder subsystem having a set of parallel dedicated numeric processors, each of the numeric processors comprising a plurality of calculation units operative in parallel on common operands to present candidate results, at least one of each of the dedicated numeric processors producing a correct result, the dedicated numeric processors reporting status information to a control unit, wherein the control unit determines which of the candidate results is the correct result for further processing. The numeric processor system according to the invention is capable of producing a final result on a floating point computation with very low latency, that is, with very few gate delays for a complete and independent computation. The numeric processor system according to the invention is particularly useful in a computation environment where successive floating point calculations are dependent. The invention is based on decomposing a normally serial algorithm into an extensive set of parallel candidate operations on different fragments of the operands, the operations being based on time-shortening assumptions, and then choosing the correct result after the operations rather than affecting the operands and modifying the calculation in series along a critical path as status information first becomes available.

2 Claims, 4 Drawing Sheets

METHOD AND APPARATUS FOR PERFORMING FLOATING POINT ADDITION

CROSS-REFERENCE TO RELATED APPLICATION

This application is a continuation-in-part of provisional U.S. patent application Ser. No. 60/001,509 filed Jul. 18, 1995 and claims the benefit thereof and incorporates by reference the entirety thereof for all purposes.

BACKGROUND OF THE INVENTION

This invention relates to microprocessors and particularly to coprocessing devices useful with the 386-, 486-, 586-, Pentium(tm)- and Pentium Pro(tm)- class of microprocessors. Among such microprocessors are those manufactured by Intel Corporation of Santa Clara, Calif., Cyrix Corporation and Advanced Micro Devices of Sunnyvale, Calif.

There is a need for compatibility of behavior of coprocessors with the microprocessors of microcomputers so that application programs and operating system programs can operate in a platform-independent environment. Special purpose coprocessors are useful for applications where particular functionality is desired.

It is common to provide very high speed floating point coprocessors by pipelining such that the floating unit takes multiple cycles to complete a job while executing multiple operations in parallel. One of the disadvantages of such a technique is that not all code can be reorganized into independent operations that can be pipelined without having operands and dependencies which force one instruction to wait for the results of previous instruction. Additionally, the instruction set architecture of the floating point coprocessors for the type 386/486/etc., or 387 instruction set architecture, has a stack-based register file. Each instruction takes the top of an eight entry register file stack, operates on that plus one other register in the register file, and puts the result back on the top of the stack. Such an operation forces each instruction to be dependent the immediately preceding instruction. It is difficult for compilers to get better than one instruction every "N" clocks where "N" is the full depth of the pipeline. Thus there is concern about the number of cycles of depth in the pipeline. While most RISC-type machines and main-frame machines are optimized to use many pipeline stages so as to achieve high operating clock frequencies, the register file dependencies created by the stack-based architecture of a 387 coprocessor results in a requirement to keep the number of stages in the pipeline as short as possible.

There is a need to achieve a two-cycle depth pipeline to compete with the internal structure of the Pentium microprocessor of Intel Corporation of Santa Clara, Calif. The Pentium co-processor element has a three-cycle pipeline depth.

The Pentium issues two instructions per cycle in general. The first instruction can perform a floating point operation using the top of the register file stack and scheduling a result to go back onto the register file stack. A following floating point instruction would then wait three cycles for the result of the first instruction to become available to the second instruction. This delay can be avoided by inserting a "floating point exchange register" (FXCH) between two floating point operations. The FXCH instruction swaps two registers, the top of stack with one other register. After executing the FXCH instruction, the top of stack would be a different register, one that was not the result of the first operation so there is no further dependency. The register exchange is done with pointers to registers rather than an actual move of register values, thus avoiding the dependency between back-to-back floating point operations, but at the expense of inserting FXCH instructions between those instructions. In the process a superscalar machine is required to be able to handle the FXCH instruction in parallel with the floating pointer adder.

The FXCH technique for other microprocessor designs is difficult because it requires a superscalar design and it requires compilers to recompile the code. Most code has not been recompiled for the Pentium. Intel's chosen approach to achieve higher performance out of the floating point unit has forced changes upon users. Existing code is compatible but performance suffers in order to maintain compatibility with the previous generations of the architecture. Therefore what is needed is a floating point unit that has two cycle latency in its floating point adder to maintain compatibility without degrading performance of existing code.

SUMMARY OF THE INVENTION

According to the invention, a numeric processor system is provided with a floating point adder subsystem having a set of parallel dedicated numeric processors, each of the numeric processors comprising a plurality of calculation units operative in parallel on common operands to present candidate results, at least one of each of the dedicated numeric processors producing a correct result, the dedicated numeric processors reporting status information to a control unit, wherein the control unit determines which of the candidate results is the correct result for further processing. The numeric processor system according to the invention is capable of producing a final result on a floating point computation with very low latency, that is, with very few gate delays for a complete and independent computation. The numeric processor system according to the invention is particularly useful in a computation environment where successive floating point calculations are dependent. The invention is based on decomposing a normally serial algorithm into an extensive set of parallel candidate operations on different fragments of the operands, the operations being based on time-shortening assumptions, and then choosing the correct result after the operations rather than affecting the operands and modifying the calculation in series along a critical path as status information first becomes available.

Specifically according to the invention, a floating point unit is provided which employs interface logic which is responsible for receiving instructions from an instruction decoder and queuing the instructions for later execution. The floating point unit schedules its owns instructions internally independently from the rest of the processor. This interface logic also has logic for queuing up operands that come from memory and queuing up operands that need to go back to memory. The logic also keeps track of the execution state of an instruction as it is processed by microcode.

The invention will be better understood by reference to the following detailed description in connection with the accompanying drawings.

DESCRIPTION OF SPECIFIC EMBODIMENTS

Figure 1:
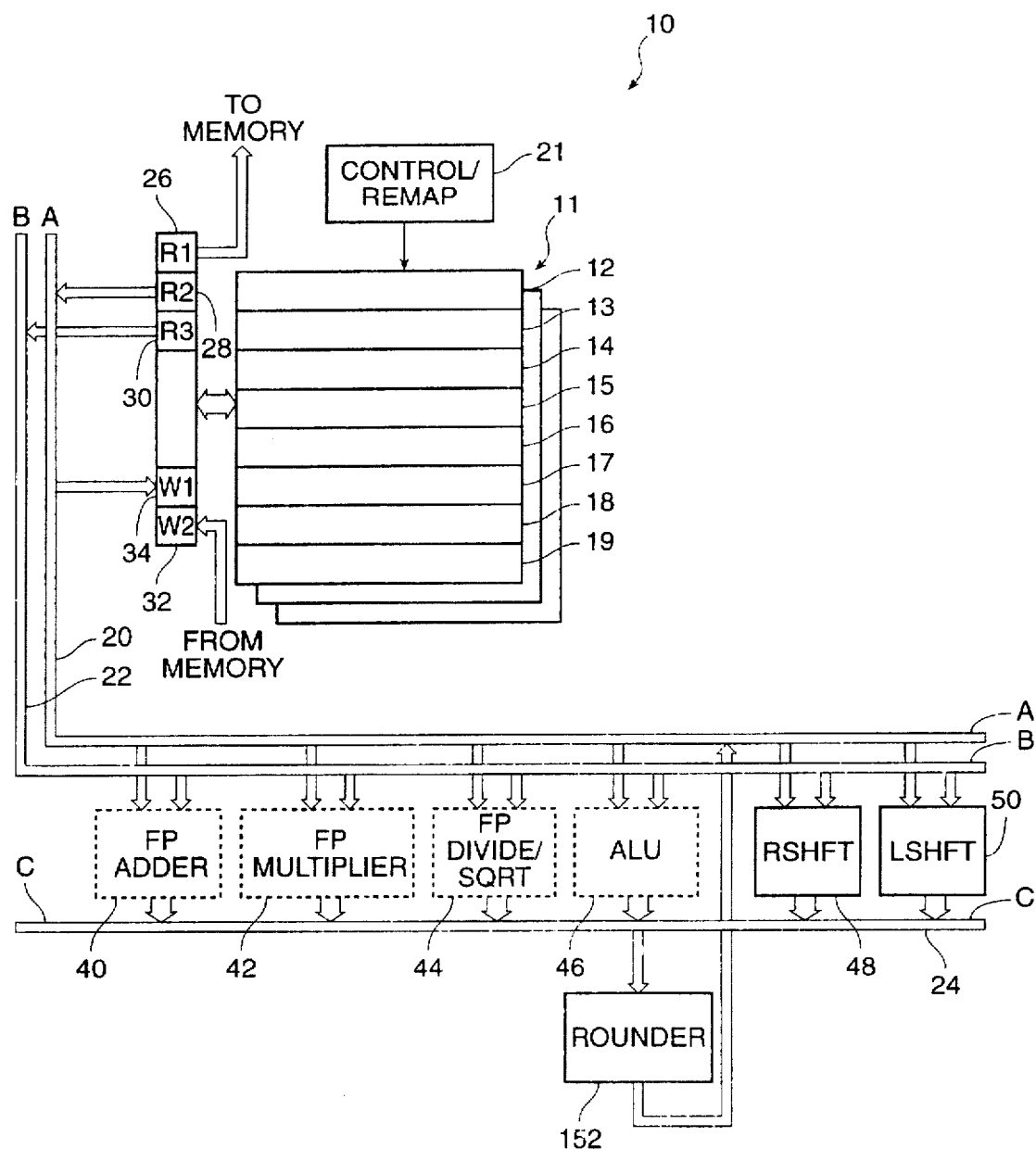
FIG. 1 is a block diagram of a floating point computation device according to the invention.

Referring to FIG. 1, there is a block diagram of a floating point unit 10 according to the invention. The floating point unit employs in a specific embodiment a register file 11 with twenty-four floating point registers. There are eight registers 12, 13, 14, 15, 16, 17, 18, 19 that are architecturally visible at any given time. A remapping control 21 keeps track of which of those twenty-four registers are assigned to be the eight architecturally visible registers at any given time so that modifications to the registers can be made provisionally without disturbing actual computations when there are later exceptions.

The register file 11 has three read ports 26, 28, 30 and two write ports 32, 34. One of the read ports 26 and one of the write ports 32 is dedicated to I/O, the process of receiving data and sending data to memory (not shown) and are not of concern here.

The remaining two read ports 28, 30 and one write port 34 are used by the execution unit to fetch two operands and then after the calculation is performed, to store the result of that calculation back to a register file location. For the two read ports 28, 30 there are two source buses A 20, B 22. Since the stack based architecture insures that one source operand will likely be the result of the preceding instruction, the source A bus 20 is provided for the write port 34 and is used simultaneously to provide a result operand to the register file and a source operand to the next instruction. The source buses 28, 30 are connected to each of the conceptual execution units within the floating point unit 11, for example to a floating point adder 40, a floating point multiplier 42, and a divide and square root logic unit 44. There is also a general purpose ALU 46 for performing operations under microcode control that are not complete adds, multiplies and divides. Other execution units are provided for special case operations, such as a right shifter 48 and a left shifter 50 which are used by microcode when operands need to be manipulated in unusual ways. These are examples of general purpose units coupled to the source buses. Of particular interest according to the invention is the floating point adder 40.

Figure 2:
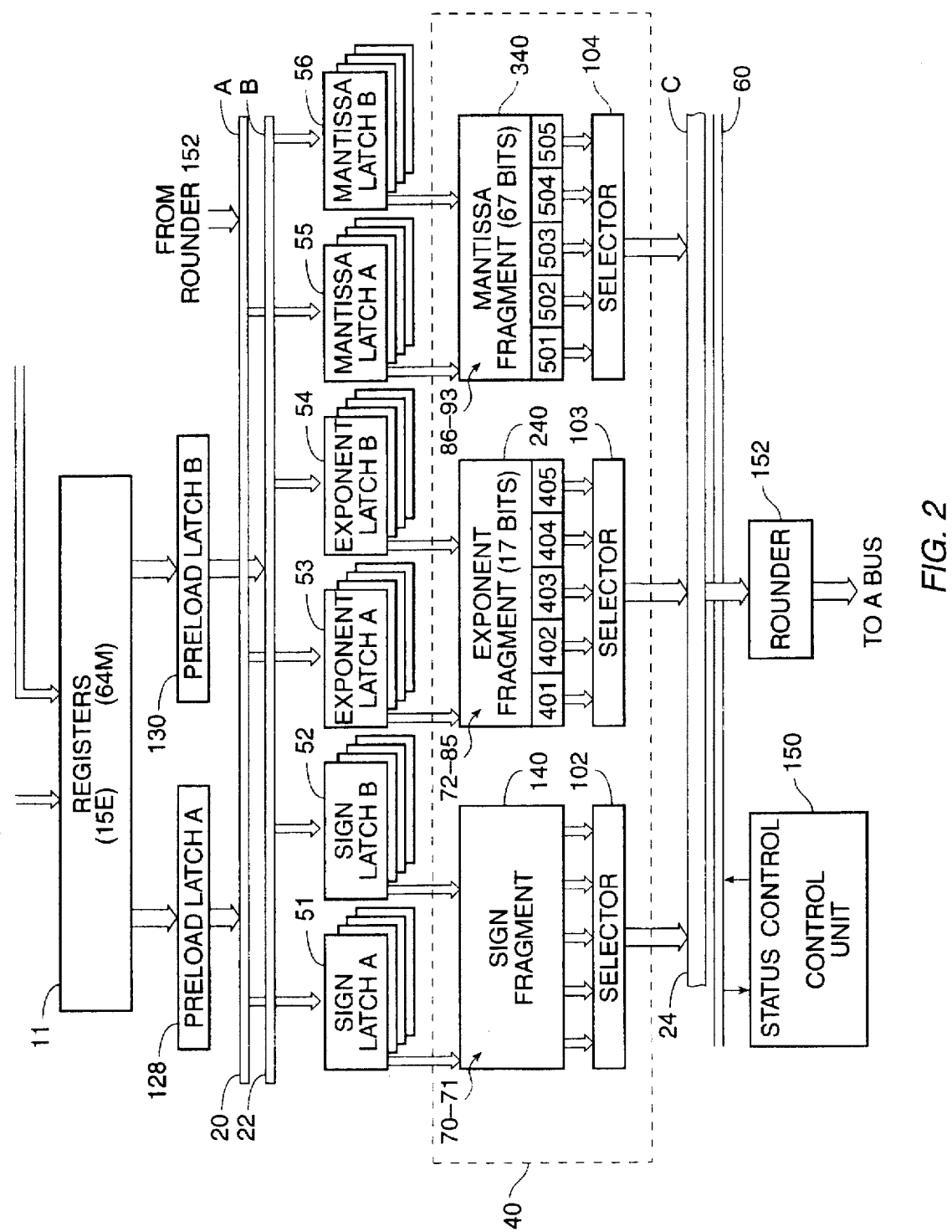
FIG. 2 is a block diagram of a floating point adder according to the invention.

Referring to FIG. 2, the fully operational floating point adder 40 is in an environment of FIG. 1 which comprises a set of registers 11, a set of pre-load latches 128, 130, source buses A 20 and B 22, and sign 51, 52, exponent 53, 54 and mantissa 55, 56 input port latches, in each of several multiple execution units 70–93 (or more) embedded in computation fragments. These all operate in parallel for different portions of the floating point numbers: the sign, exponent and mantissa.

The floating point adder 40 according to the invention is coupled to the source buses A 20 and B 22 via the various latches 51–56. The C bus 24 is connected to receive the outputs via source selectors 102, 103, 104, and then the C bus 24 is the source bus to a rounder 152, where the value is rounded to the correct precision according to a chosen rounding method and redirected onto the A bus 20 from which it is further processed or stored to the register files 11. Specifically, from the A bus the result goes into the write port 34 of the register file stack 11.

The floating point adder 40 itself is constructed of several blocks that are connected to the A, B and C buses 20, 22 and 24. The construction allows a plurality of operations of differencing and shifting to be carried out simultaneously and in parallel according to the invention as hereinafter described, which in turn are examined to determine which is the correct or most efficient execution of the desired operation to be selected. Selectors 102, 103 and 104 provide the desired result onto the C bus 24.

According to the invention, the floating point adder 40 comprises a bank of parallel floating point adder fragments which are provided for performing candidate mantissa 340, sign 140 and exponent 240 fragment operations constituting a floating point add, the fragments being connected to receive data from the A bus 20 and the B bus 22 and to supply a result to the C bus 24 through the candidate selectors 102, 103, 104, the output being directed to a single rounder 152. The rounder 152 provides an output back to the A bus 20 which can be fed into the register file stack 11. In turn the register file stack 11 is a source of input data for the A and the B buses 20 and 22. (There is a potential for conflicts due to this architecture. Conflict is rare and can be discarded because there is provided a stall mechanism and a decision mechanism which receives status reports from each of the adders from which control signals are generated to select the best answer.)

According to a further aspect of the invention, many of the execution units within the fragments 140, 240, 340 have the additional task of examining the operands and performing precision mode and precision size decisions to help out the rounder 152. Still further according to the invention, the system includes an additional auxiliary bus 60 augmenting the bus 24 which carries with the results of theses prerounding decisions to a control unit 150 to provide predecoding of the rounding information for the rounder 152. The auxiliary bus 60 is typically five bits in size. It does not carry operands, but it carries control bits which have been pre-computed for use by the rounder 152. This allows rounding-related decisions to be made while determining which select lines of selectors 102, 103 and 104 are to be activated to designate the correct value to send to the rounder 152. This avoids having to first select a value to go to the rounder and then having to look at the operands to decide what is going to happen when rounding is required. It thus saves time to look at all possible values that might be sent to the rounder 152.

All of this pipelining of data—going through the adder, the A and B buses and then onto the C bus—takes only 1-½ clocks, and the process of going through the rounder takes half of a clock. The total pipeline depth is thus only the two clocks. There is no attempt to issue one instruction per cycle into these units because the units are dependent on results in other pipes. However, it is not necessary to use the FSCH mechanism to try to eliminate that dependency, since there is only one operation pending at any one time.

Referring to FIG. 2, in a specific embodiment, sign is 1 bit, exponent is 17 bits and the mantissa is 67 bits, with an extra 5 bits of control on the auxiliary C bus 24. The structure provides extra bits of exponent and mantissa precision for overflow conditions.

Referring now to the mantissa and sign fragments 340, 140 formed by the multiple execution units (FIG. 2), latches 55, 56, 51, 52 are employed to receive the input values from the respective A and B buses 20, 22. Right shifters are elements in the mantissa data path which receive mantissa information from latches 55 and 56 and operate under the control of the exponent difference hardware 710, 712. At the output of the units, there are effectively multiplexers 104 and 102 which determine which of the candidate computations from the computation elements 401, 402, 403, 404, 405 and 501, 502, 503, 504, 505 is selected to be placed on the C bus 24. (The details of the effective multiplexers are not shown.)

Figure 3:
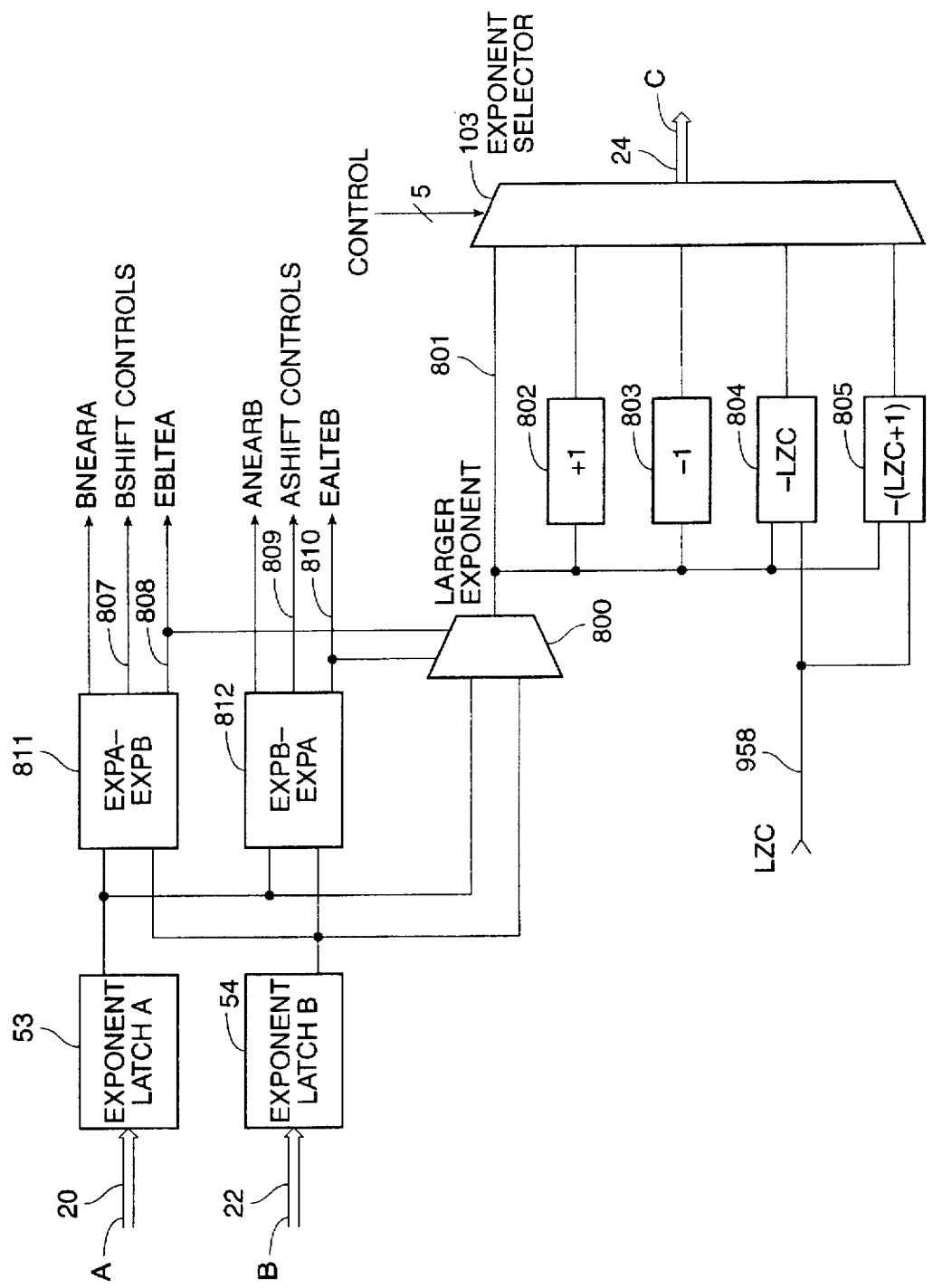
FIG. 3 is a detail of an exponent fragment according to the invention.

FIG. 3 shows details of the exponent fragment 240 in the context of the source busses 20, 22, the exponent A and B latches 53, 54, exponent selector 103 and the exponent portion of the C bus 24. Parallel computations subtract exponent A from exponent B 811 and exponent B from exponent A, 812. Blocks 811 and 812 do not compute the actual numeric difference, but instead directly generate status signals and controls which reflect the numeric difference.

Block 811 generates a control signal EB_Near_EA also known as BNEARA for control block 150 which indicates that EB may be within 1 of EA, control signals 807 for the B mantissa shifters 904, 952, and B sticky bit generator 905, and a status signal EB_LT_EA also known as EBLTEA 808 to indicate whether exponent B is less than exponent A.

Similarly, Block 812 generates a control signal indicating EA_Near_EB also known as ANEARB for control block 150 which indicates that EA may be within 1 of EB, control signals 809 for the A mantissa shifters 901, 950 and A sticky bit generator 902, and a status signal EA_LT_EB also known as EALTEB 810 which indicates whether exponent A is less than exponent B.

Multiplexor 800 selects the largest of the two exponents based upon the status signals EA_LT_EB 810 and EB_LT_EA 808. The output 801 of multiplexor 800 receives the larger exponent. Incrementor 802 increments the larger exponent 801 by one. Decrementor 803 decrements the larger exponent by one. Subtractor 804 subtracts the leading zero count 958 (from the leading zero predictor 957) from the larger exponent 801. Subtractor 805 performs the same calculation as subtractor 804, but additionally decrements the result by one.

The outputs of multiplexor 800, incrementor 802, decrementor 803, subtractor 804, and subtractor 805 represent all possible resultant exponents, and are computed in parallel. These five results are connected to the exponent selector 103, which is controlled by control block 150 to select the correct result in response to control and status signals from the from sign, exponent, and mantissa fragments 140, 240, 340, as will be described later.

Figure 4:
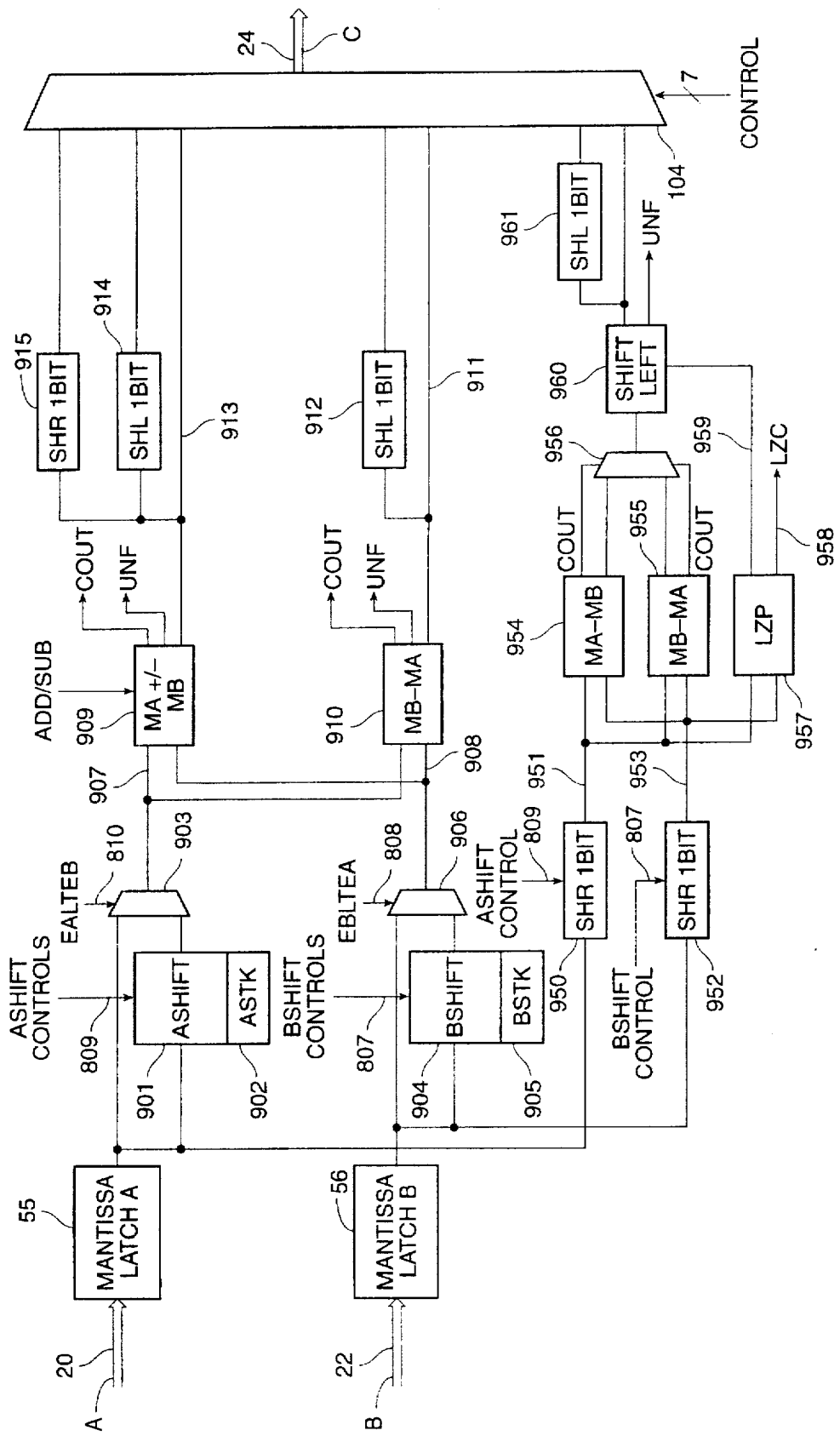
FIG. 4 is a detail of a mantissa fragment according to the invention.

FIG. 4 shows details of the mantissa fragment 340 in the context of the source busses 20, 22, the mantissa A and B latches 55, 56, mantissa selector 104, and the mantissa portion of the C bus 24.

Mantissa latch A 55 is connected to right shifter 901 performs a potentially large right shift of mantissa A, and will be used in cases where the source operands have significantly different exponents. Associated with right shifter 901 is a sticky bit generator 902 which generates the IEEE defined sticky bit on bits shifted out of the mantissa. Blocks 901 and 902 operate in response to control signals 809.

Mantissa latch B 56 is connected to right shifter 904 performs a potentially large right shift of mantissa B and will be used in cases where the source operands have significantly different exponents. Associated with right shifter 904 is a sticky bit generator 905 which generates the IEEE defined sticky bit on bits shifted out of the mantissa. Blocks 904 and 905 operate in response to control signals 807.

Multiplexor 903 chooses either the unshifted output of mantissa latch A 55 or the shifted output of right shifter 901 and sticky generator 902, in response to the status signal EA_LT_EB 810. The shifted value is selected if the A operand has a smaller exponent than the B operand. Multiplexor 906 chooses either the unshifted output of mantissa latch B 55 or the shifted output of right shifter 904 and sticky generator 905, in response to the status signal EB_LT_EA 808. The shifted value is selected if the B operand has a smaller exponent than the A operand. Thus, at most one of the parallel shifters 901, 904 and sticky generators 902, 905 will produce a value which is used in later stages in the computation.

Adder/Subtractor 909 either adds or subtracts the output of multiplexor 906 to/from the output of multiplexor 903, in response to a control signal from control block 150. If the instruction being executed is a floating point add and the operand signs are equal, or if the instruction is a floating point subtract and the operand signs are different, then the operation performed is a "true addition" and adder/subtractor 909 will perform an addition. Otherwise the operation performed is a "true subtract" and adder/subtractor 909 will perform a subtraction. Adder/subtractor 909 additionally provides carry out and underflow status signals to control block 150. Underflow is asserted if the operation is a true subtract and the most significant bit of the difference is zero.

Subtractor 910 operates in parallel with adder/subtractor 909 and subtracts the output of multiplexor 903 from the output of multiplexor 906. Subtractor 910 also generates carry out and underflow status signals for control block 150.

Left shifter 914 performs a 1 bit left shift of the output of adder/subtractor 909. Right shifter 915 performs a 1 bit right shift of the output of adder/subtractor 909. Left shifter 912 performs a 1 bit left shift of the output of subtractor 910.

Mantissa latch A 55 is also connected to right shifter 950, which operates in parallel and independently of shifter 901 and performs a zero or one bit right shift of the mantissa in response to a subset of control signals 809. This shift result 951 is correct only for the case where the exponents differ only by zero or one.

Mantissa latch B 56 is also connected to right shifter 952, which operates in parallel and independently of shifter 904 and performs a zero or one bit right shift of the mantissa in response to a subset of control signals 807. This shift result 953 is correct only for the case where the exponents differ only by zero or one. At most one of the two shifters 950, 952 will perform a right shift for any pair of operands.

Subtractor 954 subtracts shifter result 953 from shifter result 951 to generate a difference value and a carry out. Subtractor 955 subtracts shifter result 951 from shifter result 953 to generate a difference value and a carry out. Multiplexor uses the carry outs from subtractors 954 and 955 to select the difference which is zero or positive. Leading zero predict 957 operates on shifter outputs 951 and 953 to predict the number of leading zeroes in the positive difference that will be selected by multiplexor 956. The leading zero predictor generates control signals 959 for left shifter 960 and a binary count of the predicted number of leading zeroes 958.

Left shifter 960 performs a left shift of the positive difference of shifter results 951 and 953 by the number of bits predicted by leading zero predictor 957. The predicted count 958 is used by subtractors 804 and 805 to adjust the exponent value 801 by the number of bits of left shift performed in left shifter 960. For some operand values, the leading zero predictor will predict one fewer leading zeroes than actually appear. The most significant output of shifter 960 indicates underflow when zero. Left shifter 961 performs an additional 1 bit shift to eliminate an extra leading zero missed by the predictor 957. Subtractor 805 subtracts an additional one for this case.

The outputs of adder/subtractor 909, subtractor 910, and shifters 912, 914, 915, 960, and 961 represent all possible resultant mantissas, and are computed in parallel. These seven results are connected to the mantissa selector 104, which is controlled by control block 150 to select the correct result in response to control and status signals from the from sign, exponent, and mantissa fragments 140, 240, 340, as well as described below.

Not shown on FIGS. 3 and 4 are the rounding predecode units. Each of the seven potential mantissa results are examined for zero, while the lsb, guard, round, and sticky bits are computed for each potential result as a function of rounding precision (32 bit, 64 bit, 80 bit. The predecode results is selected along with the unrounded mantissa result by selector 104. This allows the predecode calculations to be performed in parallel with generation by control block 150 of the control signals for selector 104.

Control block 150 is responsible for selecting one of the five possible exponent results and one of the seven possible mantissa results. In doing so, it examines status signals from the various hardware blocks contained within the sign, exponent, and mantissa fragments 140, 240, 340. The exponent selector 103 and mantissa selector 104 are controlled as follows:

If the operation is a true addition, and overflow IS NOT indicated by adder/subtractor 909, then the output of multiplexor 800 provides the exponent result and the output of adder/subtractor 909 provides the mantissa result. If the operation is a true addition and an overflow IS indicated by adder/subtractor 909, then the output of incrementor 802 provides the exponent result and the output of right shifter 915 provides the mantissa result.

If the operation is a true subtraction and exponent subtractors 811 and 812 indicate that the exponents ARE NOT near, then a subtract will be performed via shifters 901 and 904, sticky bit generators 902 and 905, multiplexors 903 and 906, adder/subtractor 909, subtractor 910, and left shifters 912 and 914. Control block 150 will examine the carry out signals from adder/subtractor 909 and subtractor 910 to determine which unit contains the positive difference of the mantissa. If adder/subtractor 909 has a positive result, and if it DID NOT detect an underflow, then multiplexor 800 provides the exponent result and adder/subtractor 909 provides the mantissa result. If adder/subtractor has a positive result and if it DID detect an underflow, then decrementor 903 provides the exponent result and left shifter 914 provides the mantissa result. If subtractor 910 has a positive result, and if it DID NOT detect an underflow, then multiplexor 800 provides the exponent result and subtractor 910 provides the mantissa result. If subtractor 910 has a positive result, and if it DID detect an underflow, then decrementor 803 provides the exponent result and left shifter 912 provides the mantissa result.

If the operation is a true subtraction and subtractors 811 and 812 indicate that the exponents ARE near, then a subtract will be performed via shifters 950 and 952, subtractors 954 and 955, multiplexor 956, leading zero predictor 957, and shifters 960 and 961. If left shifter 960 DID NOT detect an underflow, then subtractor 804 will provide the exponent result and left shifter 960 will provide the mantissa result. If left shifter 960 DID detect an underflow, then subtractor 805 will provide the exponent result and left shifter 961 will provide the mantissa result.

The sticky bit hardware 902, 905 is a specific implementation of a tree of gates, which is actually in parallel, and which generates the sticky bit simultaneously with the right shifted value. The sticky bit is computed before the right shift has been completed so the result is available at the earliest moment it can be used.

In summary, there are numerous unique aspects of the present invention. One aspect is the N/D exponent difference element which creates select counts, which forms a combination subtractor and shift count decoder all in one. A second aspect is the sticky bit generator which is partitioned through time optimally to produce parallel results. A third aspect is the normalizer, or the leading zero counter. Therein the number of leading zeros are counted to generate shift counts, with shift controls.

The invention has now been explained in relation to specific embodiments. Other embodiments will be apparent to those of ordinary skill in the art. Specifically, one could reduce the specific number of candidate mantissa result values and/or candidate exponent result values to less than the respective seven and five with a corresponding increase in latency without departing from the scope and spirit of the present invention. It is therefore not intended that this invention be limited, except as indicated by the appended claims.

What is claimed is:

1. A method for performing a floating point addition comprising the steps of:

receiving, in an exponent value processor, a first exponent value of a first operand from a first operand source and receiving a second exponent value of a second operand from a second operand source and calculating a plurality of candidate exponent result values substantially simultaneously;

receiving, in a mantissa value processor, a first mantissa value of the first operand from the first operand source and receiving a second mantissa value of the second operand from the second operand source and calculating a plurality of candidate mantissa result values substantially simultaneously;

receiving, in a control logic element, sign values of said first operand and of said second operand;

receiving, in said control logic element, status outputs of the exponent value processor and of the mantissa value processor to generate status signals; and selecting, in said control logic element based on said status signals, from among said pluralities of candidate exponent result values and of said candidate mantissa result values to obtain a final exponent result value and a final mantissa result value, the selecting step of said control logic element comprising:

examining said status signals including sign, exponent, and mantissa status signals;

if said floating point operation is a true addition, and overflow is not indicated, then providing output of the exponent result and output the mantissa result via multiplexor means;

if the operation is a true addition and an overflow is indicated, then providing the exponent result via an incrementor and providing the mantissa result via a right shifter; and if the operation is a true subtraction and exponents are not near in value, then performing a subtract via bit shifter means, sticky bit generator means, multiplexor means, adder/subtractor means, subtractor means, and left shifter means said bit shifter means, said sticky bit generator means, said multiplexor means, said adder/subtractor means, said subtractor means, and said left shifter means, being coupled in series for performing said subtract, the true subtraction operation further including the steps of:

examining carry out signals from the adder/subtractor means and the subtractor means to determine which unit contains the positive difference of the mantissa;

if the adder/subtractor means produces a positive result, and if an underflow is not detected, then providing the exponent result via the multiplexor means and providing the mantissa result via the adder/subtractor means;

if the adder/subtractor means has a positive result and if it an underflow is detected, then providing the exponent result via a decrementor means and providing the mantissa result via the left shifter means;

if the subtractor means has a positive result, and if no underflow is detected, then providing the exponent result via the multiplexor means and providing the mantissa result via the subtractor means;

if subtractor means has a positive result, and if underflow is detected, then providing the exponent result via the decrementor means and providing the mantissa result via the left shifter means; and if the operation is a true subtraction and the subtractor means indicate that the exponents are near in value, then performing the subtract operation via shifter means, multiplexor means, and a leading zero predictor, said shifter means, said multiplexor means, and said leading zero predictor being coupled in series for the subtract operation.

2. In the method according to claim 1 said true subtraction operation further including the steps of:

providing the exponent result via the subtractor means and the exponent result via left shifter means, if the left shifter means did not detect an underflow;

if the left shifter means did detect an underflow, then providing the exponent result via the subtractor means and providing the mantissa result via the left shifter means.

* * * * *